(12) United States Patent
Usami et al.

(10) Patent No.: US 6,785,814 B1
(45) Date of Patent: Aug. 31, 2004

(54) INFORMATION EMBEDDING METHOD AND APPARATUS

(75) Inventors: Yoshinori Usami, Kanagawa-ken (JP); Wataru Ito, Kanagawa-ken (JP); Akira Yoda, Kanagawa-ken (JP)

(73) Assignee: Fuji Photo Film Co., LTD, Kanagawa-ken (JP)

( * ) Notice: Subject to any disclaimer, the term of this patent is extended or adjusted under 35 U.S.C. 154(b) by 0 days.

(21) Appl. No.: 09/362,376

(22) Filed: Jul. 28, 1999

(30) Foreign Application Priority Data

| Jul. 28, 1998 | (JP) | ............................................ 10/212087 |
| Jul. 28, 1998 | (JP) | ............................................ 10/212799 |
| Jul. 28, 1998 | (JP) | ............................................ 10-212800 |

(51) Int. Cl.[7] .............................. H04N 1/44; H04L 9/32
(52) U.S. Cl. ........................ 713/176; 713/171; 380/200; 380/54; 382/100
(58) Field of Search ................................ 713/176, 171; 382/100; 380/200, 54

(56) References Cited

U.S. PATENT DOCUMENTS

| 5,465,299 | A | * | 11/1995 | Matsumoto et al. ........ 713/176 |
| 5,822,436 | A | * | 10/1998 | Rhoads ......................... 380/54 |
| 6,131,162 | A | * | 10/2000 | Yoshiura et al. ............ 713/176 |
| 6,351,439 | B1 | * | 2/2002 | Miwa et al. ............. 369/47.18 |
| 6,535,616 | B1 | * | 3/2003 | Hayashi et al. ............ 382/100 |
| 6,611,830 | B2 | * | 8/2003 | Shinoda et al. ................ 707/3 |

FOREIGN PATENT DOCUMENTS

| JP | 5224290 | 9/1993 |
| JP | 8289159 | 11/1996 |
| JP | 9214636 | 8/1997 |
| JP | 10108180 | 4/1998 |

OTHER PUBLICATIONS

K. Matsui, "Digital Watermark," O Plus E, No. 213, 1997, pp. 70–77 (w/English language translation).
K. Matsui, "Video Steganography," pub. from Morikita Shuppan, 1993, pp. 34–57 (w/English language translation).

* cited by examiner

*Primary Examiner*—Ly V. Hua
(74) *Attorney, Agent, or Firm*—Birch, Stewart, Kolasch & Birch, LLP

(57) ABSTRACT

Supplementary information related to original data is embedded in the original data without being lost or altered and without degrading the quality of the original data. A photographing condition or the like regarding photographing of the original image data is generated as the supplementary information by supplementary information generating means and stored in a database on a network by supplementary information storing means. Storage management information such as a URL address of where the supplementary information is stored is generated by storage management information generating means and embedded by embedding means in the original image data by using deep layer encryption. The original image data in which the storage management information has been embedded are recorded in a recording medium. Since the storage management information has a smaller amount of data than the supplementary information, quality of the original data is prevented from being degraded even when the storage management information is embedded in the original image data.

6 Claims, 10 Drawing Sheets

PRIOR ART

COMPOSITION (a)  (b)

INFORMATION EMBEDDING METHOD AND APPARATUS

BACKGROUND OF THE INVENTION

1. Field of the Invention

The present invention relates to an information embedding method and apparatus for embedding information in original data such as image data by using a deep layer encryption method or the like and to a supplementary information reading method and apparatus for obtaining supplementary information related to a the original data based on the embedded information, and also to a computer-readable recording medium storing a program to cause a computer to execute the above methods.

The present invention also relates to an image processing method and apparatus, and more specifically, to a method and apparatus for processing the original data wherein the supplementary information related to the data has been embedded by using deep layer encryption.

2. Description of the Related Art

Various kinds of information such as image, audio, and movie data have been digitized, and data in various file formats exist, depending on a recording medium to store the data or on application software to use the data. For example, as formats for image data used on the Internet, JPEG, GIF, and FlashPix proposed by Eastman Kodak Co. have been known, and image data in a format suitable for the content of an image are exchanged. Following installation of infrastructure of such open networks, the chances of processing or using data via various kinds of recording media and applications have been growing. For example, the chances of repeatedly processing image data by using different applications or saving image data in various formats have been growing.

For this reason, it has been very useful to add information to data, in prospect of more complex and general usage of the data in an open network environment. For example, when image data obtained by a digital camera or the like are converted to output data such as a hard copy, ways in which the image data are manipulated are different depending on a photographed scene. In a case like this, if light source information of the photographed scene, such as color fog, under-exposure, over-exposure and the like, is known, appropriate image processing can be carried out on the image data, depending on the light source information. Furthermore, by adding a keyword to original data, various useful effects are expected, such as capability of a search for the original data after database compilation. Meanwhile, for print data used in the field of printing, information regarding process management such as an instruction of trimming or correction of an image and information as to which page the image belongs to is added to image data for publishing, and process management can be carried out by compiling the management information into a database.

How to add the supplementary information to original data is an issue to be considered. In reality, supplementary information is attached to an original data file as a file separate from the original data file, or written in a header of the original data file. However, in the former case, if various kinds of processing are carried out on the image data by various kinds of applications, or if format conversion is carried out, correspondence between the original data and the supplementary information may not be maintained. In the latter case, the supplementary information in the header cannot be read in some cases depending on application software, or the information written in the header may be lost as a result of carrying out format conversion after reading the data. In other words, the file header has a basic part and an extension part, and the supplementary information is included in the extension part which may be lost or altered by repeated writing or reading.

Meanwhile, various methods for embedding authentication information or copyright information in original data by using deep layer encryption have been proposed (see Japanese Unexamined Patent Publication Nos. 8(1996)-289159, 10(1998)-108180, 9(1997)-214636, for example). According to these methods, when the original data are image data for example, by embedding authentication information and copyright information in a redundant portion of the data, the information embedded in the data can be read and displayed by using an apparatus and software for reading the information, although the embedded information cannot be confirmed by simply reproducing the image data. This kind of deep layer encryption is described in detail in various references (for example, see K. Matsui, "Digital Watermark", O Plus E No. 213, 1997).

As methods for this kind of deep layer encryption, methods of various types such as a pixel space utilizing type, a quantization error utilizing type, and a frequency range utilizing type have been known. The pixel space utilizing type takes out a plane of 3×3 pixels around a target pixel for example, and supplementary information is embedded in the surrounding 8 bits. The quantization error utilizing type pays attention to a quantization error which occurs in a process of compressing image data. Quantization output is regulated into even numbers and odd numbers by using 0 and 1 of a bit series of the supplementary information and the supplementary information is embedded in the image data as apparent quantization noise. "Video Steganography" (in Japanese) by K. Matsui published from Morikita Shuppan in 1993 has the details of the quantization error utilizing type. The frequency range utilizing type is a method of embedding supplementary information in a frequency range of an image area to which the human visual system is comparatively insensitive. For example, since a high frequency component in an image is the range wherein the human visual system is comparatively insensitive, supplementary information can be embedded by decomposing image data into a plurality of frequency bands so that the information can be embedded in the high frequency band and by reconstructing the image data thereafter. As a characteristic of the human visual system, sensitivity to color difference and to chroma information is generally lower than to luminance information. Therefore, a range wherein invisible recording is possible exists in a difference between the luminance and the color difference or between the luminance and the chroma information. Consequently, the supplementary information can be embedded in this range.

In addition to these methods, methods of embedding supplementary information in a bit plane having a low S/N ratio as an image by concealing the information in noise redundancy, or in redundancy of an information change in a pixel block (space) of a predetermined range, or in a quantization error occurring in the case of degeneracy of data amount due to coding for data compression, can be used, for example.

An information embedding method using information conversion redundancy of a pixel block in a density pattern for representing tones in a binary image will be explained next.

A density pattern method is a method of representing multi-valued tones by a binary bit map. FIG. 16 is a diagram showing the case of representing tones by an area change of a unit, using 4 binary pixels as one unit. The number of tones Leq which can be represented by the specific number of bits L and n×n pixels can be expressed as follows:

$$Leq=(L-1)n^2+1 \quad (1)$$

Therefore, for the case shown in FIG. 16, 5 tones can be expressed. As is obvious from FIG. 16, as a pattern of showing one quantization level (the same tone), several patterns exist depending on which of the 4 pixels has a bit representing black. For example, there is only one pattern for the quantization levels 0 and 4. However, the quantization levels 1 and 3 have 4 patterns each and the quantization level 2 has 6 patterns. In other words, since the number of patterns is determined by a combination arrangement of m black pixels and ($n^2$-m) white pixels out of $n^2$ pixel arrangements, there are $n^2Cm$ patterns for one tone. By using these redundant pixel arrangement patterns for the same quantization level, other information can be expressed.

When the information is an integer, the number of integers which can be allocated is 4, that is, 2 bits in the case of the quantization level 1. In other words, the number BITm of bits which can be allocated at quantization level m is found by using the following equation:

$$BITm=[\log_2(n^2Cm)] \quad (2)$$

Therefore, for the case of the quantization level 2, BIT2= $[\log_2(2^2C2)]=\log_2 6=2.585$ can be found from Equation (2). The number of bits which can be represented by the entire 4-pixel block is BIT0+BIT1+BIT2+BIT3+BIT4=0+2+2.585+2+0=6.585 bits. In this manner, the position of the black pixels as a piece of information can be represented in redundancy. In other words, there are only 4 levels as visual information, while various variations exist in each quantization level in terms of information redundancy.

Furthermore, an image photographed by an imaging apparatus such as a digital camera can be used by carrying out various kinds of processing thereon. For example, panorama processing by photographing a plurality of images and by composing these photographs together so that a huge visual field or depth which cannot be expressed by a single image can be expressed by using a sophisticated image composing technique which is characteristic and available only for digital data. In such panorama processing, in order to compose the images together after photographing, photographing is carried out by using a tripod for panoramic image photographing so that coordinates of the images to be composed together agree geometrically. Alternatively, photographing is carried out in such a manner that the images to be composed together neither overlap nor have a gap. The images are composed together by carrying out distortion correction and interpolation by using geometric information included in each image.

By embedding such supplementary information described above in original data by using deep layer encryption, the supplementary information is prevented from being altered or lost. However, the amount of data to be embedded and quality degradation of original data are in a trade-off relation. For example, when the original data are image data, image quality is degraded if the amount of the embedded information is large. Therefore, in order to retain the quality of the original data, it is necessary to restrict the amount of embedded information.

In the case where image composition is carried out as has been described above, in order to cause the coordinates of the images to be composed together to agree geometrically, a tripod having high rigidity and accuracy is necessary, and photographing is carried out on a large scale. Meanwhile, in the case where the images are composed together by interpolation or the like using geometric information included in the images, no large-scale apparatus is necessary. However, matching up images which has not been carried out upon photographing needs to be carried out at the time of image composition. For example, as shown in FIG. 17, processing to cause features in the images to become consecutive (a manual processing or an advanced algorithm for searching for a characteristic point from the images) needs to be carried out. As shown in FIG. 17, when a lighting condition (in this case, the sun) differs among the images, the state wherein images are formed, such as exposure or fog, is different for each image. Therefore, at a joint of 2 images, density needs to change smoothly. However, when the state of the image is too different between the 2 images, the density cannot be corrected in some cases. As shown in FIG. 18, in the case where a photographing location or magnification is different between the images, the images need to be reduced or enlarged so that characteristic points in each image correspond to each other, and the relation between the images needs to be changed substantially.

Furthermore, depending on aberration of lenses used in digital cameras, as shown in FIG. 19, there are cases of an image being deformed in a shape of an arc (y=f·θ, y=f·sin θ, as shown in FIG. 19(*b*)) or an image which needs deformation upon image composition (y=f·tan θ, as shown in FIG. 19(*a*)), and image composition processing becomes more complicated due to such deformation.

In order to cope with this problem, there is a method of attaching photographing information such as a photographing position of an image to image data representing the image as supplementary information. However, in the case where image composition wherein only a portion of an image is used for composition or for geometric distortion is carried out, the supplementary information attached to the image alone may not have enough information in some cases and precise composition is not carried out.

Furthermore, when image processing such as frequency processing is carried out on an image, it is possible to attach frequency information of the image as supplementary information to image data representing the image. However, depending on a characteristic of an imaging apparatus by which the image data have been obtained, the frequency characteristic may be different in each portion of the image. Therefore, even when the frequency information attached to the image is appropriate for a portion of the image, the information may not be appropriate for other portions of the image. Consequently, even if image processing is carried out on a portion of the image according to the supplementary information, appropriate frequency processing may not be carried out on that portion.

SUMMARY OF THE INVENTION

The present invention has been created based on consideration of the above problems. An object of the present invention is to provide a method and apparatus for embedding information in original data by using a deep layer encryption method without degrading the quality of the original data and without losing or altering the supplementary information described above, to provide a supplementary information reading method and apparatus for obtaining the supplementary information related to the original data based on the embedded information, and to provide a computer-readable recording medium storing a program to cause a computer to execute the methods.

Another object of the present invention is to provide an information embedding method and apparatus for obtaining supplementary information enabling appropriate processing on a portion of an image even when only the portion is used for composition or processing, and a computer-readable recording medium storing a program to cause a computer to execute the method.

Still another object of the present invention is to provide an image processing method and apparatus for effectively carrying out processing in accordance with the supplementary information on the original data by using a deep layer encryption method, without losing or altering the supplementary information.

A first information embedding method of the present invention is a method of embedding information in original data, and comprises the steps of:
  storing supplementary information related to the original image in predetermined storage;
  generating storage management information indicating where the supplementary information has been stored; and
  embedding the storage management information in the original data.

The "supplementary information" herein referred to means information related to the original data, and copyright information and authentication information of the original data, a photographing condition of an image in the case of the original data being image data, a reading condition in the case of image data read from a film or a print, search information of the original data, and the like can be listed as the supplementary information.

As the "predetermined storage", a database owned by a user, a database on a network, and the like can be used.

As the "storage management information", information regarding the address, a telephone number, and an E-mail address of a person storing the supplementary information, or a URL address on the Internet can be listed, for example.

It is preferable for the first information embedding method of the present invention to embed the storage management information in the original data after carrying out deep layer encryption on the supplementary information.

"To embed the supplementary information after carrying out deep layer encryption" means to embed the encrypted supplementary information in a redundant portion of the original data, and the method regarding this embodiment is described in the reference by Matsui cited above.

A first information embedding apparatus of the present invention is an apparatus for embedding information in original data, and comprises:
  supplementary information storing means for storing supplementary information related to the original image in predetermined storage;
  storage management information generating means for generating storage management information indicating where the supplementary information has been stored; and
  embedding means for embedding the storage management information in the original data.

In the first information embedding apparatus of the present invention, it is preferable for the embedding means to embed the storage management information in the original data by carrying out deep layer encryption on the supplementary information.

A supplementary information reading method of the present invention comprises the steps of:
  obtaining the original data in which the storage management information has been embedded according to the first information embedding method of the present invention;
  reading the storage management information from the original data; and
  obtaining the supplementary information based on the storage management information.

A supplementary information reading apparatus of the present invention comprises:
  data obtaining means for obtaining the original data in which the storage management information has been embedded by the first information embedding apparatus of the present invention;
  storage management information reading means for reading the storage management information from the original data; and
  supplementary information obtaining means for obtaining the supplementary information based on the storage management information.

A second information embedding method of the present invention comprises the steps of;
  dividing an original image represented by original image data into a plurality of areas and for obtaining image data for each area; and
  embedding supplementary information related to each area in the image data for each area by carrying out deep layer encryption on the supplementary information.

It is preferable for the second information embedding method to divide the original image into a plurality of block areas.

Alternatively, the original image may be divided into areas of each object included in the original image.

"To be divided into areas of each object" means to be divided into an area of a figure and an area for its background, when the original image includes a figure and the background, for example.

It is preferable for the supplementary information for each area to be information regarding image processing for the area.

The "information regarding image processing" means information such as subject coordinate information found from a location and a direction of photographing, presence or absence of a light source such as the Sun, information regarding composition processing such as lens aberration or the like, and information regarding frequency processing such as a frequency characteristic of the image.

It is preferable for the supplementary information for each area to be information representing a keyword for searching for the area.

A second information embedding apparatus of the present invention comprises:
  division means for dividing an original image represented by original image data into a plurality of areas and for obtaining image data for each area; and
  embedding means for embedding supplementary information for each area in the image data for each area by carrying out deep layer encryption on the supplementary information.

An image processing method of the present invention comprises the steps of:
  reading supplementary information related to original data from the original image data such as audio, image, and movie data in which the supplementary information has been embedded by deep layer encryption;
  determining processing to be carried out on the original data, based on the supplementary information; and
  carrying out processing on the original data, based on the determined processing.

It is preferable for the original data and the supplementary information to be image data acquired by an imaging apparatus and information indicating a photographing condition at the time of acquisition of the original data, respectively.

The "photographing condition" herein referred to means not only information regarding a characteristic of the imaging apparatus used for photographing, a photographing environment, a purpose of photographing, and a subject, but also information regarding a location, a direction, and the time and date of photographing, for example.

It is preferable for the original data to be image data obtained by reading an image recorded on a film or a print, and, in this case, it is also preferable for the supplementary information to be a reading condition used upon reading the original data.

The "reading condition" means a device condition, a characteristic condition, and a set-up condition of a reading apparatus to read the original data.

It is also preferable for the original data and the supplementary information to be image data and process management information regarding the original data, respectively.

The "process management information" means information such as history of image processing carried out on the original data, the degree of completeness thereof, the time and date of the processing, a deadline for the processing, and the relationships of jobs.

It is preferable for the supplementary information to be search information showing a search keyword of the original data.

The "search information" means information which can be a keyword for a search, such as the file name of the original data, and the content of the original data.

It is also preferable for the original data and the supplementary information to be image data and information representing an image related to the original data, respectively.

The "information representing an image related to the original data" means, in the case where images of a construction site are the original data, and the name of the site, the time and date of photographing, progress and the like are photographed at the same time, for example, information representing an image obtained by photographing a board describing the name of the site and the like or a memorandum showing the content of the original data.

It is preferable for the original data and the supplementary information to be image data and a processing condition used at the time of output processing on the original data.

The "processing condition used at the time of output processing" means a printing condition when the original data are printed, for example.

An image processing apparatus of the present invention comprises:

reading means for reading supplementary information from original data in which the supplementary information related to the original data has been embedded by deep layer encryption;

determination means for determining processing to be carried out on the original data, based on the supplementary information; and processing means for carrying out processing on the original data, based on the determined processing.

An imaging apparatus of the present invention is an imaging apparatus for obtaining image data representing a subject by photographing the subject, and comprises:

embedding means for embedding second image data obtained by photographing a second subject related to a first subject in first image data obtained by photographing the first subject, by carrying out deep layer encryption on the second image data.

It is preferable for the imaging apparatus of the present invention to further comprise selection means for selecting whether or not the second image data are embedded in the first image data.

The first and the second information embedding methods and the image processing method of the present invention may be provided as a program to cause a computer to execute the methods stored in a computer-readable recording medium.

The first information embedding method and apparatus of present invention stores the supplementary information in predetermined storage and the storage management information indicating where the supplementary information has been stored is embedded in the original data. A user who has received the original data in which the storage management information has been embedded reads the storage management information from the original data to obtain the information regarding the storage, and obtains the supplementary information from the storage based on the storage management information.

The storage management information has a comparatively small amount of data such as the address and an E-mail address of a person storing the supplementary information and a URL address on the Internet. Therefore, the storage management information can be embedded in the original data without degrading the quality of the original data. Furthermore, since the storage management information is embedded in the original data unlike information recorded in a header, the information is not lost or altered if various kinds of processing, saving or reading are repeatedly carried out on the original data. Moreover, correspondence between the storage management information and the original data is not confusing. Therefore, the storage management information always follows the original data, and by using the storage management information, the supplementary information is obtained without losing the correspondence with the original data.

Moreover, by embedding the storage management information in the original data after deep layer encryption thereof, accesses to the supplementary information can be limited, which leads to retaining of secrecy of the supplementary information.

According to the second information embedding method and apparatus of the present invention, an original image is divided into a plurality of areas and the image data for each area are obtained. The supplementary information for each area is embedded in the image data for the corresponding area after deep layer encryption of the supplementary information. Therefore, the supplementary information regarding each area, such as search processing and image processing like composition processing and frequency processing for each area, can be embedded. By reading the embedded supplementary information, optimal processing for each area can be carried out based on the supplementary information for each area.

In the case where the supplementary information is embedded in the entire original image data and processing is carried out by dividing the original image, the supplementary information may be lost or altered in some cases. However, according to the present invention, since the supplementary information for each area is embedded in each area, the supplementary information of the divided original image is not lost.

According to the image processing method and apparatus of the present invention, the supplementary information is embedded in the original data by deep layer encryption of the supplementary information. Therefore, unlike information recorded in a header, the supplementary information is not lost or altered if various kinds of processing, saving, or reading are repeatedly carried out on the original data. Furthermore, correspondence between the supplementary information and the original data is not confusing. Therefore, the storage management information always follows the original data and by using the storage management information, appropriate processing can be carried out on the original data.

DESCRIPTION OF THE PREFERRED EMBODIMENTS

Hereinafter, embodiments of the present invention will be explained with reference to the accompanying drawings.

Figure 1:
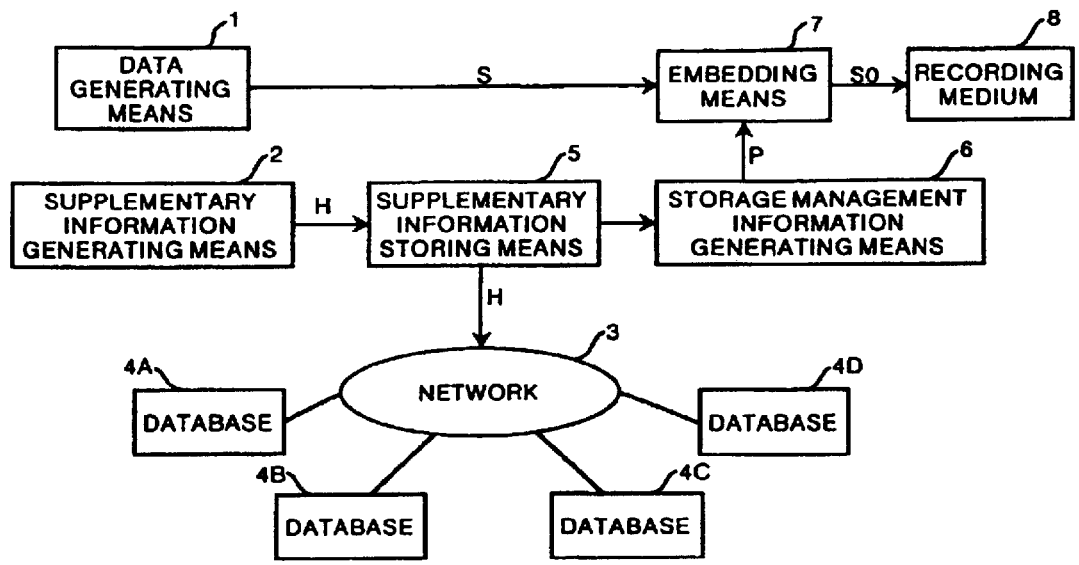
FIG. 1 is a block diagram showing an outline configuration of an information embedding apparatus according to a first embodiment of the present invention.

FIG. 1 is a block diagram showing an outline configuration of an information embedding apparatus according to a first embodiment of the present invention. As shown in FIG. 1, the information embedding apparatus according to the first embodiment is to embed information in image data, and comprises data generating means 1, such as a digital camera and an image reading apparatus, for generating original image data S, supplementary information generating means 2 for generating supplementary information H such as a photographing condition or a reading condition at the time the data generating means 1 obtains the original image data S, supplementary information storing means 5 for storing the supplementary information H in databases 4A~4D on a network 3, storage management information generating means 6 for generating storage management information P indicating where the supplementary information H has been stored, and embedding means 7 for embedding the storage management information P in the image data S by using deep layer encryption of the supplementary information to generate original image data S0 embedded with the storage management information P, and for recording the original image data S0 embedded with the storage management information P in a recording medium 8 such as a hard disc, a database on the network, an MO disc, a CD-R, or a ZIP disc.

The storage management information generating means 6 generates the storage management information P regarding where the supplementary information H is stored by the supplementary information storing means 5. In the case where the supplementary information H is stored in the databases 4A~4D on the network 3 as in this embodiment, the URL address of the databases is generated as the storage management information P. The storage management information P may be the address, a telephone number, or an E-mail address of a person who owns a database storing the supplementary information H.

In the embedding means 7, the storage management information P is embedded in the original image data S0 by using various deep layer encryption methods such as the ones described in Japanese Unexamined Patent Publication Nos. 8(1996)-289159, 10(1998)-108180, and 9(1997)-214636, or the pixel space utilizing method, the quantization error utilizing method, or the frequency range utilizing method.

An operation of the first embodiment will be explained next. The data generating means 1 generates the original image data S. Meanwhile, the photographing condition, the reading condition, and the like are generated as the supplementary information by the supplementary information generating means 2, and stored in the databases 4A~4D on the network 3 by the supplementary information storing means 5. The storage management information generating means 6 generates the storage management information P regarding where the supplementary information H has been stored by the supplementary information storing means 5. The storage management information P generated by the storage management information generating means 6 is embedded by the embedding means 7 in the original data S after deep layer encryption of the storage management information, and the original image data S0 embedded with the storage management information P are recorded in the recording medium 8.

Figure 2:
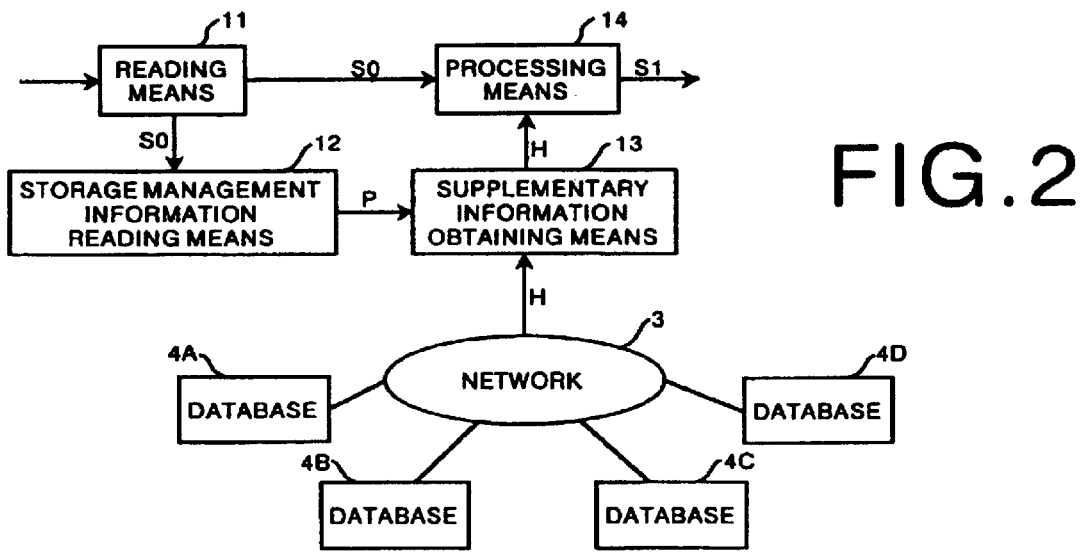
FIG. 2 is a block diagram showing an outline configuration of an image processing apparatus.

FIG. 2 is a block diagram showing an outline configuration of an image processing apparatus for reading the supplementary information H based on the original image data S0 wherein the storage management information P has been embedded according to the deep layer encryption method, and for carrying out image processing on the original image data S0 based on the supplementary information H. As shown in FIG. 2, the image processing apparatus comprises reading means 11 for reading the original image data S0 from the recording means 8, storage management information reading means 12 for reading the storage management information P embedded in the original image data S0 according to deep layer encryption, supplementary information obtaining means 13 for obtaining the supplementary information H from the databases 4A~4D on the network 3, based on the storage management information P, and processing means 14 for obtaining processed image data S1 by carrying out image processing on the original image data S0 based on the supplementary information H obtained by the supplementary information obtaining means 13.

An operation of the image processing apparatus shown in FIG. 2 will be explained next. The original image data S0 recorded in the recording medium 8 are read by the reading means 11. Meanwhile, the storage management information P embedded in the original image data S0 is read by the storage management information reading means 12, and input to the supplementary information obtaining means 13. The supplementary information obtaining means 13 obtains the supplementary information H by accessing the databases 4A~4D on the network 3 storing the supplementary information H, based on a URL address or the like indicated by the storage management information P. In the case where the storage management information P shows the address, a telephone number, an E-mail address or the like of the person who owns the database storing the supplementary information H, the user directly accesses the person and obtains the supplementary information H. The supplementary information H obtained by the supplementary information obtaining means 13 is input to the processing means 3. Based on the supplementary information H, image processing is carried out on the original image data S0 and the processed image data S1 are obtained. For example, when the supplementary information H is photographing information such as a photographed scene or light source information, exposure correction, color fog correction and the like is carried out based on the supplementary information H, and color correction such as complexion correction is carried out based on information regarding the subject. The processed image data S1 are reproduced by reproduction means (not shown in FIG. 2) such as a monitor or a printer.

As has been described above, in the first embodiment, the storage management information P regarding where the supplementary information H has been stored, rather than the supplementary information H related to the original image data S0, is embedded in the original image data S0. Since the storage management information P has a comparatively small amount of data such as a URL address on the Internet, or the address, telephone number, and E-mail address of the person storing the supplementary information H, the storage management information P can be embedded in the original image data S without degrading the quality of the original image data. Furthermore, even in the case where the format of the original image data S0 is changed or the image data S0 are repeatedly saved or read, the storage management information P is not lost or altered. Moreover, the correspondence between the storage management information P and the original image data S0 is not confusing. Therefore, the original image data S0 are always accompanied by the related storage management information P, and by using the storage management information P, the supplementary information H is obtained without losing the correspondence with the original image data S0.

By embedding the storage management information P in the original image data S according to deep layer encryption, accesses to the supplementary information H are limited and secrecy of the supplementary information H can be retained.

In the first embodiment described above, the storage management information P is embedded in the original image data S. However, the storage management information P can be embedded not only in image data but also in various kinds of original data such as audio data or movie data.

Furthermore, in the case where the supplementary information H does not need to be secret, the storage management information P can be embedded without carrying out deep layer encryption thereon.

A second embodiment of the present invention will be explained next.

Figure 3:
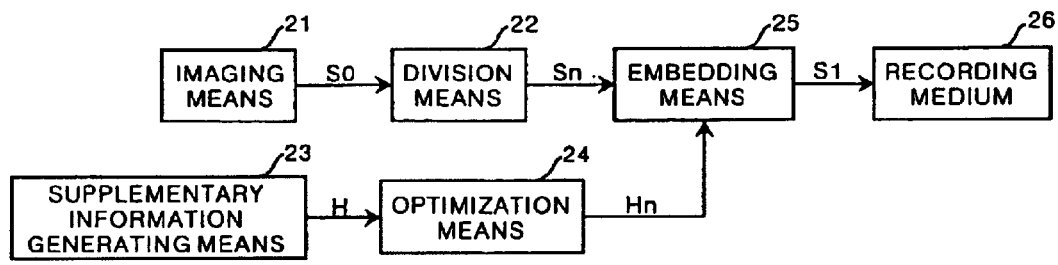
FIG. 3 is a block diagram showing an outline configuration of an information embedding apparatus according to a second embodiment of the present invention.

FIG. 3 is a block diagram showing an outline configuration of a digital camera to which an information embedding apparatus according to the second embodiment of the present invention has been applied. As shown in FIG. 3, the digital camera to which the information embedding apparatus according to the second embodiment has been applied comprises imaging means 21 such as a CCD, division means 22 for dividing an image represented by original image data S0 obtained by the imaging means 21 into areas of a plurality of blocks and for obtaining image data Sn for each area, supplementary information generating means 23 for generating information regarding photographing by the imaging means 21 as supplementary information H, optimization means 24 for obtaining supplementary information Hn for each area by optimizing the supplementary information H for each area divided by the division means 22, and embedding means 25 for embedding the supplementary information Hn for each area in image data Sn for the corresponding area by using deep layer encryption, and for recording the image data embedded with the information in a recording medium 26 such as a hard disc, a database on a network, an MO disc, a CD-R, or a ZIP disc. The supplementary information Hn for each area means information by which optimal processing can be carried out on the area when the image obtained by photographing is used for partial manipulation or composition, and includes a location of photographing (coordinates), distance to a subject and angle information in the divided area estimated from the location, and a photographing condition (an image forming position of a lens, a position of a light source, zoom, presence or absence of iris, aberration of the lens, and the like), for example.

When division means 22 divides the original image into the areas of a plurality of blocks, the shape of the block is not limited to rectangles and any shape, such as a triangle, can be used.

In the embedding means 25, as in the embedding means of the first embodiment, the supplementary information Hn for each area is embedded in the image data Sn for the corresponding area by using deep layer encryption adopting various methods such as the methods of embedding copyright information described in Japanese Unexamined Patent Publication Nos. 8(1996)-289159, 10(1998)-108180, and 9(1997)-214636, or the methods of the pixel space utilizing type, the quantization error utilizing type, or the frequency range utilizing type.

An operation of the second embodiment will be explained next. The original image data S0 are obtained by the imaging means 21 by photographing a subject. The original image data S0 are divided into the plurality of areas by the division means 22 and the image data Sn for each area are obtained. Meanwhile, in the supplementary information generating means 23, photographing information regarding photographing of the subject is generated as the supplementary information H. The supplementary information H is optimized for the image data Sn for the corresponding area by the optimization means 24, and the supplementary information Hn for each area is obtained. The supplementary information Hn for each area is embedded in the original image data Sn by the embedding means 25 according to deep layer encryption, and the original image data S1 embedded with the supplementary information H are recorded in the recording medium 26.

Figure 4:
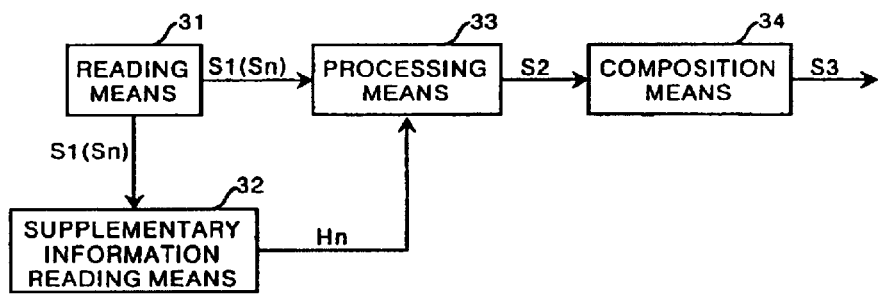
FIG. 4 is a block diagram showing an outline configuration of an image composing apparatus.

FIG. 4 is a block diagram showing an outline configuration of an image composing apparatus for reading the supplementary information Hn for each area from the image data Sn for the corresponding area included in the original image data S1 in which the supplementary information H has been embedded by deep layer encryption, and for composing a plurality of images based on the supplementary information Hn for each area. As shown in FIG. 4, the image composing apparatus comprises reading means 31 for reading the original image data S1 from the recording medium 26, supplementary information reading means 32 for reading the supplementary information Hn for each area embedded by deep layer encryption in the image data Sn for the corresponding area included in the original image data S1, processing means 33 for obtaining processed image data S2 by carrying out processing such that areas of original images to be composed together agree with each other, and composition means 34 for composing the processed image data S2 and for obtaining composite image data S3.

The processing means 33 finds out how the areas of the original images to be composed together correspond to each other and how to carry out enlargement, reduction and alteration upon image composition, and carries out the processing based on the supplementary information Hn embedded in each area.

An operation of the image composition apparatus shown in FIG. 4 will be explained next. The original image data S1 recorded in the recording medium 26 are read by the reading means 31. Meanwhile, the supplementary information Hn for each area embedded in the image data Sn for the corresponding area included in the original image data S1 is read by the supplementary information reading means 32 and input to the processing means 33. In the processing means 33, based on the supplementary information Hn for each area, the processed image data S2 are obtained after processing on the image data Sn for each area so that areas to be composed together agree with each other. The processed image data S2 are then composed by the composition means 34 and the composite image data S3 are obtained. The composite image data S3 are reproduced by reproduction means (not shown) such as a monitor or a printer.

As has been described above, according to the second embodiment, the original image is divided into a plurality of areas and the image data Sn for each are obtained. The supplementary information Hn for each area is embedded in the image data Sn for the corresponding area by deep layer encryption. Therefore, the photographing information for each area is embedded in each area, and the embedded supplementary information Hn for each area is read by the image composition apparatus. In this manner, optimal processing for each area is carried out by the image composition apparatus, based on the embedded supplementary information Hn for each area.

In the case where the supplementary information is embedded in the entire original image data S1, the supplementary information H may be lost or altered when processing is carried out by dividing the original image. According to the second embodiment, since the supplementary information Hn for each area is embedded in the image data Sn for the corresponding area, the supplementary information is prevented from being lost even when the original image is divided.

In the second embodiment, the photographing condition is embedded as the supplementary information Hn for each area in the image data Sn for the corresponding area. However, instead of the photographing condition, frequency information of the image may be embedded as the supplementary information Hn for each area. The case where the frequency information is embedded as the supplementary information Hn for each area will be explained as a third embodiment.

An imaging apparatus such as a camera forms an image on a photosensitive material or on a imaging medium or device such as a CCD by using an imaging optical system such as a lens. Lenses are designed to suppress optical aberration or the like as much as possible. However, depending on by which part of a lens the photographed image is formed, MTF (Modulation Transfer Function, an evaluation index showing a space frequency characteristic in optical transfer) is different. As a result, even in the same image, the MTF characteristic is different for each portion of the image. For example, MTF is degraded at an edge compared with a subject center (center of angle of view). Therefore, the edge cannot have the same sharpness and resolution as the center. An entire image obtained by photographing is generally used and processing such that the subject at the center becomes optimal is carried out on the photographed image without considering the variance in the MTF characteristic in the view angle. However, in the case where the photographed image is divided into a plurality of areas and processing is carried out as in the second embodiment, optimal processing for each area is necessary.

Therefore, in the third embodiment, by embedding frequency information representing a frequency characteristic for each area in the image data Sn for each area in the case where the photographed image is divided into a plurality of areas, sharpness processing which is optimal for each area is carried out.

Figure 5:
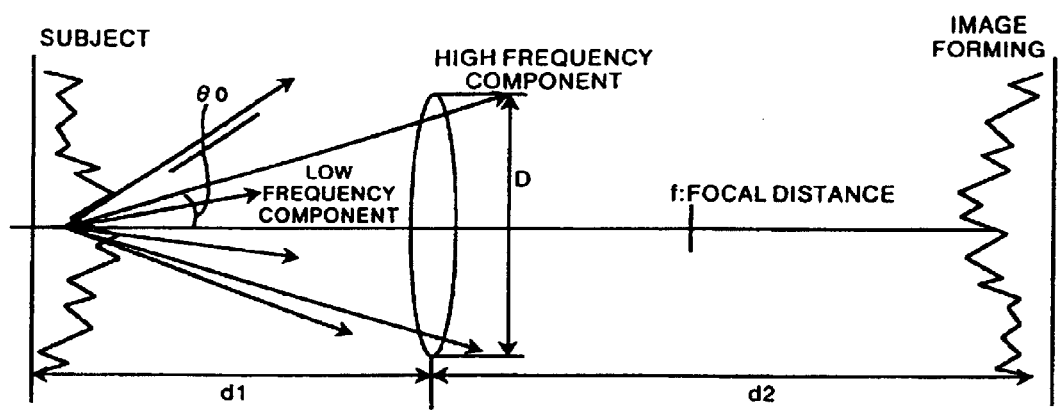
FIG. 5 is an image forming system, in which a lens is positioned in the center, a general imaging system.

Since a lens aperture is not infinite and not all light from an object reaches an imaging plane, an effect in terms of sharpness appears at the time of image forming. FIG. 5 is a diagram showing an image forming system centering a lens in a general imaging system. An image forming condition for the lens is expressed as follows:

$$1/d_1 + 1/d_2 = 1/f \tag{3}$$

In other words, the size of the image is maximal when $d_2 = f$ and brightness of the image is proportional to $(1/d_2^2)^2$.

Consider a subject having a light intensity distribution $g(x)$. Since the aperture of the lens is limited, the image is formed only by light entering at a solid angle from the photographed subject to the lens. A direction of diffraction of a frequency distribution F of the intensity distribution $g(x)$ is expressed as follows by the Fraunhofer approximation:

$$u(\theta) = K_0 \varphi e^{j2\pi Fx}\bigg|_{f=\frac{\sin\theta}{\lambda}} = K_0 6\left(\frac{\sin\theta}{\lambda} - F\right) \tag{4}$$

Therefore, the diffracted light propagates to a direction of $\theta = \sin^{-1}(F\lambda)$, and the larger the F, that is, the higher the frequency, the larger the diffraction angle θ. A maximum frequency component Fc in FIG. 5 is $$Fc = \sin\theta_0/\lambda = D/2\lambda d_1 \quad (5)$$

Therefore, components higher than Fc in the intensity distribution g(x) of the subject do not contribute image forming, and the image becomes blurry. In other words, depending on the lens aperture or diffraction power, resolution upon image forming is affected.

Using Fourier transform for explaining this phenomenon, image forming is expressed as follows from the Fresnel approximation, in the case where an image is formed at a focal point $z_i=f$ at the rear of the lens:

$$E(xi, yi, f) = \frac{1}{j\lambda f} e^{jk\left(f + \frac{xi^2 + yi^2}{2f}\right)} G\left(\frac{xi}{\lambda f}, \frac{yi}{\lambda f}\right) \quad (6)$$

where $$G\left(\frac{xi}{\lambda f}, \frac{yi}{\lambda f}\right)$$

is a Fourier transform of a 2-dimensional subject g(x, y). Considering an effect of a pupil function p(x, y) as the aperture of the lens, $$E(xi, yi, f) = \frac{1}{j\lambda f} e^{jk\left(f + \frac{xi^2 + yi^2}{2f}\right)} G\left(\frac{xi}{\lambda f}, \frac{yi}{\lambda f}\right) * \overline{P}\left(\frac{xi}{\lambda f}, \frac{yi}{\lambda f}\right) \quad (7)$$

is obtained where $$\overline{P}\left(\frac{xi}{\lambda f}, \frac{yi}{\lambda f}\right)$$

is a Fourier transform of the pupil function p(x, y).

In other words, the image becomes blurry due to an effect caused by the aperture plane (convolution).

As has been described above, upon processing by the imaging optical system, contrast reproducibility (resolution) is determined based on an optical characteristic of the device such as the lens characteristic. As an evaluation index therefor, MTF described above is used. MTF is expressed as follows:

$$M_0(x) = \frac{E_{oj}\max(u) - E_{oj}\min(u)}{E_{oj}\max(u) + E_{oj}\min(u)} \quad (8)$$

$E_{oj}\max(u)$, $E_{oj}\min(u)$ are maximum and minimum effective exposure at a certain frequency (u), and indicate the contrast of an output image to an input image. As a characteristic of MTF, when an image is formed via a plurality of devices, a final MTF can be expressed as a product of each device's MTF characteristic, such as Msystem=Mlens×Mccd×Mprinter . . .

The MTF characteristic of an optical system such as a lens at the time of photographing is changed by performance of the lens or a position where the image is formed, for example. Therefore, the MTF characteristic becomes different depending on a position in the photographed image.

In the third embodiment, attention is paid to the difference in the MTF characteristic between positions in the image, and the MTF characteristic of each area is embedded as the frequency information when the image is divided into a plurality of areas. In other words, in the third embodiment, the frequency information representing the MTF characteristic is generated as the supplementary information H instead of the photographing information or included in the photographing information generated by the supplementary information generating means 23 of the information embedding apparatus of the second embodiment shown in FIG. 3. The frequency information is embedded by the embedding means 25 in each area divided by the division means 22, as the supplementary information Hn for each area, and the original image data S1 are generated.

As a method of dividing the original image, the image may be divided in blocks as in the second embodiment. Alternatively, the image may be divided in concentric areas around the center of the image in order to correspond to the MTF characteristic of the lens.

When a portion of the original image data S1 embedded with the frequency information as the supplementary information Hn for each area is used for trimming or clipping, the image data Sn for the area to be processed are read and the corresponding supplementary information Hn for the area is read therefrom. Based on the supplementary information Hn for the area, optimal frequency processing such as sharpness processing is carried out on the image data for the area. For example, for an area at the center of the image, processing, such as one in which the frequency characteristic is not greatly enhanced, is carried out, while for an area near the edge of the image, processing enhancing of high frequency components is carried out.

In the second and third embodiments described above, the original image is divided into areas of blocks. However, the original image may be divided into areas of objects included in the image, such as areas for the subject and its background, and areas of each figure in a class photograph.

In the second embodiment described above, image composition is carried out based on the embedded supplementary information Hn for each area. However, only a necessary area may be extracted for trimming or clipping processing. In this case, when the areas are divided for each object in the original image, the object can be used as it is for trimming or clipping, which is more preferable.

A fourth embodiment of the present invention will be explained next.

Figure 6:
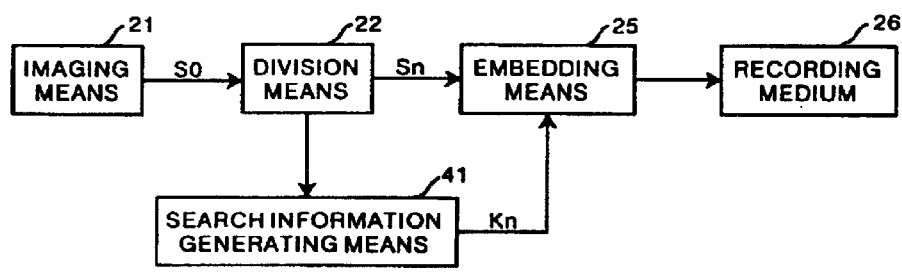
FIG. 6 is a block diagram showing an outline configuration of an information embedding apparatus according to a fourth embodiment of the present invention.

FIG. 6 is a block diagram showing an outline configuration of an information embedding apparatus according to the fourth embodiment of the present invention. As shown in FIG. 6, the information embedding apparatus comprises the imaging means 21, the division means 22, and embedding means 25 as in the information reading apparatus shown in FIG. 3 according to the second embodiment. The fourth embodiment is different from the second embodiment in the following points. As the supplementary information Hn for each divided area, search information Kn for each area is generated by search information generating means 41, and embedded in the image data Sn for each area by the embedding means 25. The recording means 26 for recording the original image data S1 embedded with the search information Kn is a database. As the search information Kn, a keyword for expressing the content of each area is used, for example.

Figure 7:
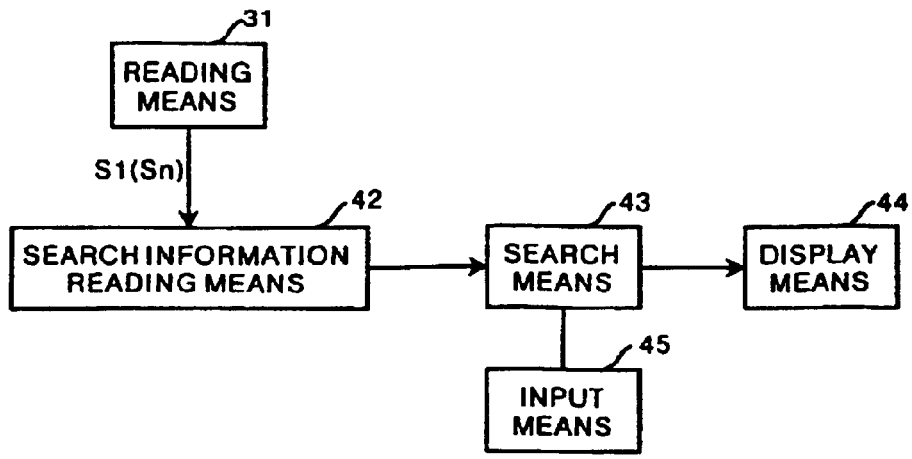
FIG. 7 is a block diagram showing an outline configuration of a search apparatus.

FIG. 7 is a block diagram showing an outline configuration of a search apparatus for searching for image data Sn for each area in which the search information Kn has been embedded by the information embedding apparatus according to the fourth embodiment. As shown in FIG. 7, the search apparatus comprises the reading means 31 as in the image composing apparatus shown in FIG. 4, search information reading means 42 for reading the search information Kn from the image data Sn for each area included in the original image data S1 read by the reading means 31, search means 43 for carrying out the search based on the search information Kn, display means 44 for displaying a result of the search, and input means 45 for inputting a search keyword or the like.

An operation of the search apparatus will be explained next. A search keyword is input from the input means 45. The reading means 31 reads the original image data S1 from the database and the search information reading means 42 reads the search information Kn embedded in the image data Sn for each area. The search information Kn is input to the search means 43 and the search result is displayed on the display means 44 after agreement with the keyword is searched for.

In the case where image data in a database are conventionally searched for, the data are searched for only in a unit of data. However, by embedding the search information Kn in the image data Sn for each area in the original image data S1 as in the fourth embodiment, a detailed element of the original image data S1 can be searched for. Furthermore, since the search keywords can be enriched, a search with a high degree of redundancy, that is, an ambiguous search can be carried out.

In the second to fourth embodiments described above, the supplementary information H is embedded in the original image data S0 obtained by a digital camera. However, the present invention is not limited to the above example. For image data obtained by photoelectrically reading an image on a film or a print, the image data Sn for each area are obtained by dividing the image into a plurality of areas and the supplementary information Hn for each area can be embedded in the image data Sn for the corresponding area.

An embodiment of an image processing method and apparatus of the present invention will be explained next.

Figure 8:
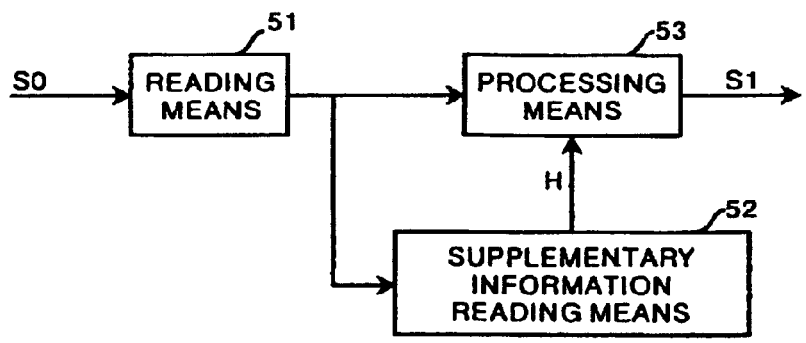
FIG. 8 is a block diagram showing an outline configuration of an image processing apparatus according to a fifth embodiment of the present invention.

FIG. 8 is a block diagram showing an outline configuration of an image processing apparatus according to a fifth embodiment of the present invention. As shown in FIG. 8, the image processing apparatus according to the fifth embodiment carries out image processing on the original image data S0 read from a recording medium or transferred via a network. The image processing apparatus comprises reading means 51 for reading the original image data S0, supplementary information reading means 52 for reading the supplementary information H embedded in the original image data S0 by using deep layer encryption, and processing means 53 for carrying out image processing on the original image data S0, based on the supplementary information H read by the supplementary information reading means 52, and for obtaining the processed image data S1.

Figure 9:
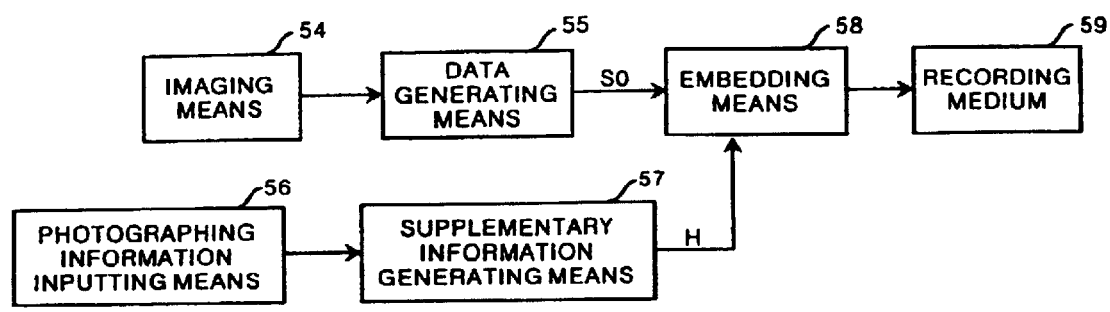
FIG. 9 is a block diagram showing an outline configuration of a digital camera to obtain original image data.

The original image data S0 used in the fifth embodiment are obtained by a digital camera shown in FIG. 9, for example. As shown in FIG. 9, the digital camera comprises imaging means 54 such as a CCD, data generating means 55 for generating the original image data S0 representing a subject from data obtained by the imaging means 54, photographing information inputting means 56 for inputting photographing information, supplementary information generating means 57 for generating the supplementary information H by encrypting the photographing information, and embedding means 58 for embedding the supplementary information H in the image data S0 by using deep layer encryption, and for recording the image data in a recording medium 59. As the photographing information to be input by the photographing information inputting means 56, information regarding a photographed scene, a light source, a photographing condition, a photographing environment, the time and date of photographing, a purpose of photographing, and a subject can be listed, for example.

In the embedding means 58, as in the first embodiment, the supplementary information H is embedded in the original image data S0 by using deep layer encryption employing the pixel space utilizing method, the quantization error utilizing method, the frequency range utilizing method or the like.

An operation of the fifth embodiment will be explained next. An image of a subject is photographed by the imaging means 54 of the digital camera shown in FIG. 9, and the original image data S0 are generated by the data generating means 55. Meanwhile, the photographing information regarding photographing of the subject by the imaging means 54 is input from the photographing information inputting means 56, and the supplementary information H is generated from the photographing information by the supplementary information generating means 57. The supplementary information H is embedded in the original image data S0 by the embedding means 58 according to the deep layer encryption method, and the data are recorded in the recording medium 59.

The original image data S0 recorded in the recording medium 59 are read by the reading means 51 of the image processing apparatus shown in FIG. 8. The supplementary information H is also read by the supplementary information reading means 52 and input to the processing means 53. In the processing means 53, image processing is carried out on the original image data S0 based on the supplementary information H, and the processed image data S1 are obtained. For example, based on the information regarding a photographed scene or a light source included in the supplementary information, exposure correction, color fog correction, and the like is carried out, and color correction such as complexion correction is then carried out based on subject information. The processed image data S1 are reproduced by reproduction means (not shown) such as a monitor or a printer.

As has been described above, in the fifth embodiment, the supplementary information H related to the original image data S0 is embedded in the original image data S0 by deep layer encryption. Therefore, the supplementary information H is not lost or altered even when the format of the original image data S0 is changed or repeated saving or reading is carried out on the image data. Consequently, the supplementary information H can always be read from the original image data S0 and optimal image processing can be carried out on the image data S0, based on the supplementary information H.

In the above fifth embodiment, the supplementary information H is embedded in the original image data S0 obtained by the digital camera. However, a reading condition such as information regarding a subject of an image, the kind of a film, a set-up condition, and the like may be embedded as the supplementary information H in the original image data S0 obtained by photoelectrically reading the image recorded on a silver halide film or on a print by using a photograph finishing system in a laboratory. In this case, the supplementary information H is read from the image original image data S0 by the image processing apparatus according to the fifth embodiment in the same manner as has been described above, and image processing is carried out on the original image data S0, based on the supplementary information H.

When the original image data S0 are printed for the first time by a photograph finishing system in a laboratory, an image processing condition such as frequency processing or tone processing carried out on the original image data S0 may be embedded as the supplementary information H in the original image data S0 by using deep layer encryption. In this case, the original image data S0 are recorded in a recording medium such as a CD-R and provided to a user. The user carries out processing such as trimming or composition with a template on the original image data S0 and requests printing from a laboratory by bringing the image data S0. In the laboratory, the processing specified by the user is carried out, and the supplementary information H embedded in the original image data S0 is read and prints the original image data S0 are printed by carrying out image processing on the image data S0 according to the same image processing condition used at the first time printing. Different processing has been carried out conventionally on image data to be printed, depending on the kind of a film or an apparatus which has obtained the image data, or by a judgment made by an operator to change the processing condition. Therefore, images having constant quality are not necessarily reproduced whenever the original image data S0 are printed. On the other hand, by embedding the image processing condition at the first time printing as the supplementary information H in the original image data S0, image processing is carried out on the image data S0, using the same image processing condition as at the first time printing. Therefore, constant quality images can be obtained at any time.

In the fifth embodiment, the photographing information such as the information regarding a photographed scene or a subject is used as the supplementary information H. However, as in a GPS utilizing camera described in Japanese Unexamined Patent Publication No. 5(1993)-224290 for example, information regarding a position, direction, and time and date of photographing may be obtained by using the positioning radio waves from GPS satellites, and this information may be embedded in the original image data S0 as the supplementary information H by using deep layer encryption.

Figure 10:
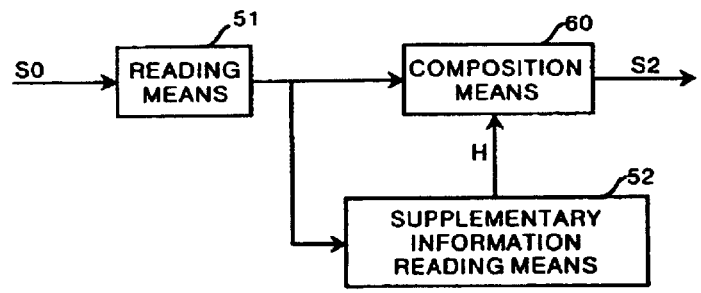
FIG. 10 is a block diagram showing an outline configuration of another image composing apparatus.

In this case, the supplementary information H can be used as follows. In other words, several sets of the original image data S0 are obtained by panoramic photographing wherein a plurality of scenes are photographed at an almost equal angle interval while the information regarding a position and a direction of the photographing is obtained by using the positioning radio waves from GPS satellites, and the information is embedded as the supplementary information H in the original image data S0 by using deep layer encryption. FIG. 10 is a block diagram showing an outline configuration of an image composition apparatus for obtaining composite image data by composing the sets of the original image data S0 obtained by the panoramic photographing. The image composition apparatus shown in FIG. 10 comprises the reading means 51 and the supplementary information reading means 52 shown in FIG. 8 and composition means 60 for obtaining composite image data S2 by composing the sets of the original image data S0. The supplementary information H of the sets of the original image data S0 is read by the supplementary information reading means 52. The composing means 60 composes the image data by carrying out geometric correction and correction of the view angle of the image represented by each set of the original image data S0, based on the information of the position and direction of photographing included in the supplementary information H.

As has been described above, by embedding the information such as photographing direction as the supplementary information H in the original image data S0, composition of the panoramically photographed images can be carried out easily, based on the supplementary information H. Furthermore, for image data obtained according to different formats and by different cameras, the supplementary information H is embedded in the image data, and images can be composed together easily by reading the supplementary information H.

Figure 11:
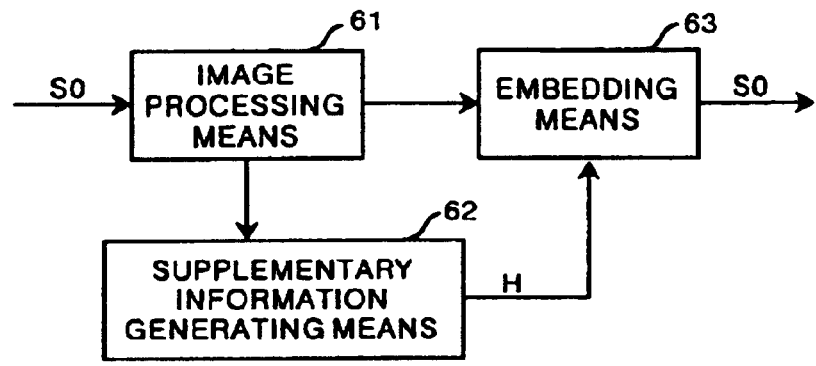
FIG. 11 is a block diagram showing an outline configuration of an image processing apparatus used in a sixth embodiment of the present invention.

A sixth embodiment of the present invention will be explained below. FIG. 11 is a block diagram showing an outline configuration of an image processing apparatus used in the sixth embodiment. As shown in FIG. 11, the image processing apparatus is an image processing apparatus for carrying out various kinds of image processing, such as color tone correction, magnification or resolution conversion, and geometric conversion such as trimming, separately on the original image data S0 when the image data S0 are used as make-up data for printing. The image processing apparatus comprises image processing means 61 for carrying out image processing such as those described above on the original image data S0, supplementary information generating means 62 for generating process management information such as history of image processing, a degree of completeness, the time and date of processing, the deadline for the processing, and a relationship between jobs, as the supplementary information H, and embedding means 63 for embedding the supplementary information H in the original image data S0 by using deep layer encryption as by the digital camera shown in FIG. 9.

Figure 12:
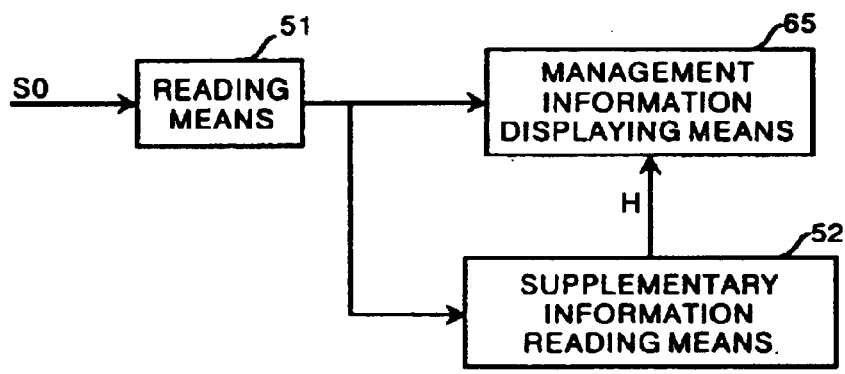
FIG. 12 is a block diagram showing an outline configuration of a process managing apparatus according to the sixth embodiment.

FIG. 12 is a block diagram showing an outline configuration of a process managing apparatus according to the sixth embodiment. As shown in FIG. 12, the process managing apparatus is for managing an image processing process of the original image data S0 wherein the supplementary information H has been embedded by the image processing apparatus shown in FIG. 11. The process managing apparatus comprises the reading means 51 and the supplementary information reading means 52 of the image processing apparatus according to the fifth embodiment, and management information displaying means 65 for displaying the process management information of the image data S0, based on the supplementary information H.

An operation of the sixth embodiment will be explained below. When image processing is carried out on the original image data S0 by the image processing means 61 of the image processing apparatus shown in FIG. 11, process management information such as processing history of the original image data S0, the degree of completeness, and the time and date of processing is generated as the supplementary information H by the supplementary information generating means 62, and embedded in the original image data S0 by the embedding means 63 by using deep layer encryption. The original image data S0 embedded with the supplementary information H are read by the reading means 51 of the process managing apparatus shown in FIG. 12, and the supplementary information H is read by the supplementary information reading means 52. Based on the supplementary information H having been read, the progress and the deadline of the image processing on the original image data S0 are displayed on the management information displaying means 65. An operator can understand the progress or the like of the image processing on the original image data S0, based on the management information displayed by the management information displaying means 65.

In order to manage an image processing process for each set of original image data, a more sophisticated management database for managing data at each process has been necessary, following increasing complexity of the processing. On the other hand, in the sixth embodiment, the database for separately managing the process becomes unnecessary by embedding the process management information or the like as the supplementary information H in the original image data S0 by using deep layer encryption. Therefore, it becomes possible to understand the process management information by directly accessing the original image data S0. Furthermore, a search for the original image data S0 becomes possible by using a keyword of the process (such as a processing name, a processing level, and the degree of completeness).

Figure 13:
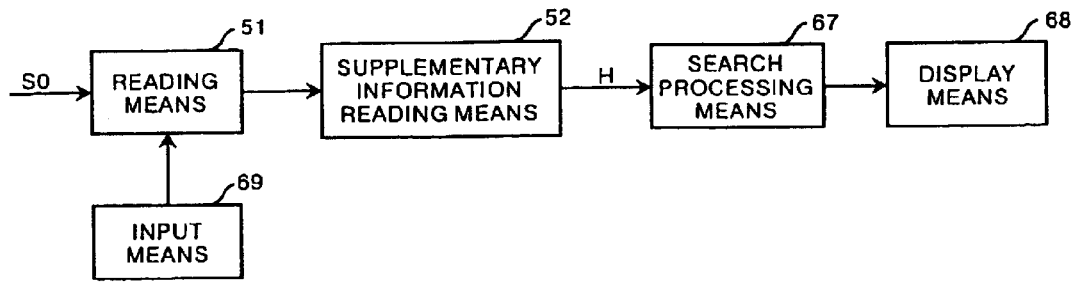
FIG. 13 is a block diagram showing an outline configuration of a search apparatus according to a seventh embodiment of the present invention.

A seventh embodiment of the present invention will be explained next. The seventh embodiment relates to a search apparatus for searching for data by reading the supplementary information H from the original data S0 (image data, audio data, movie data, and the like). A search keyword such as the name of the file and the content of the file is embedded as the supplementary information H in the original data S0 by deep layer encryption. FIG. 13 is a block diagram showing an outline configuration of the search apparatus according to the seventh embodiment. As shown in FIG. 13, the search apparatus comprises the reading means 51 and the supplementary information reading means 52 as in the fifth embodiment, search processing means 67 for carrying out a search based on the supplementary information H, display means 68 for displaying a result of the search, and input means 69 for inputting a search keyword or the like. The original data S0 used in the seventh embodiment may exist not only in a database of each computer but also distributively in databases on a network.

An operation of the seventh embodiment will be explained below. In order to carry out a search, the search keyword is input from the input means 69. The reading means 51 accesses the database and reads the sets of the original data S0. The supplementary information reading means 52 reads the supplementary information H from each set of the original data S0. The supplementary information H is input to the search processing means 67 and search keyword agreement is searched for. The search result is displayed on the display means 68.

Since various kinds of data in various formats exist in a database, it has been difficult to carry out a uniform search of all data by using a single search engine. However, as in the seventh embodiment, by embedding the search information as the supplementary information H in the original data S0 by using a common deep layer encryption method, a uniform search by one search engine becomes possible.

Figure 14:
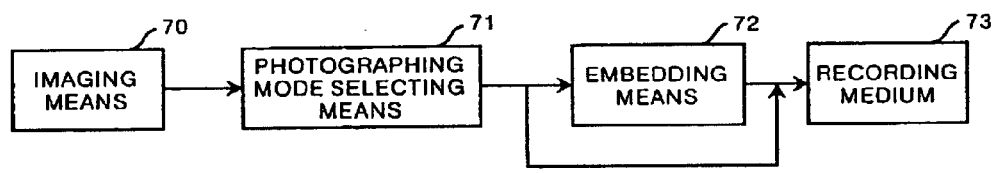
FIG. 14 is a block diagram showing an outline configuration of an imaging apparatus according to an eighth embodiment of the present invention.

An imaging apparatus of the present invention will be explained as an eighth embodiment of the present invention. FIG. 14 is a block diagram showing an outline configuration of the imaging apparatus according to the eighth embodiment. As shown in FIG. 14, the imaging apparatus according to the eighth embodiment is a digital camera and comprises imaging means 70 such as a CCD, photographing mode selecting means 71 for selecting a photographing mode of the image data obtained by the imaging means 70, and embedding means 72 for embedding image data related to specific image data as supplementary information H in the specific image data which will be explained later, and for recording the specific image data in a recording medium 73.

The photographing mode selecting means 71 is for selecting whether the image data obtained by the imaging means 70 are recorded in the recording medium 73 as they are or embedded as supplementary information H in the specific image data.

The embedding means 72 is for carrying out monochromic conversion and binary conversion of the image data and to embed the image data as the supplementary information H in other image data. More specifically, in the case where the image data are 8-bit data, color information of the image data is converted into information of 1 bit per pixel, and embedded in the least significant bit out of the 8-bit data of the R signal to which the human visual system is comparatively insensitive, out of the RGB signals of the image data wherein the supplementary information H is embedded. As the image to be embedded as the supplementary information H, an image whose content after binary conversion thereof is comparatively easily discerned is used, such as handwritten letters, figures, and maps.

Figure 15:
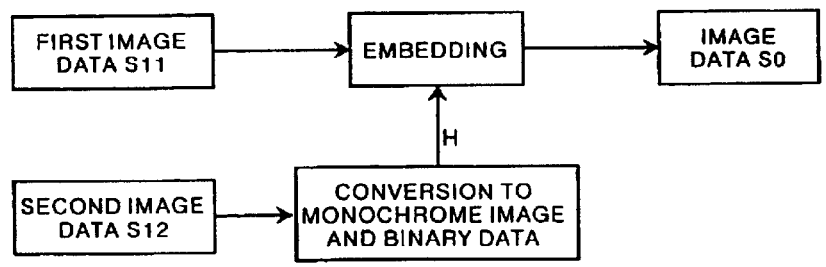
FIG. 15 is a diagram explaining processing carried out in the imaging apparatus according to the eighth embodiment.
Figure 16:
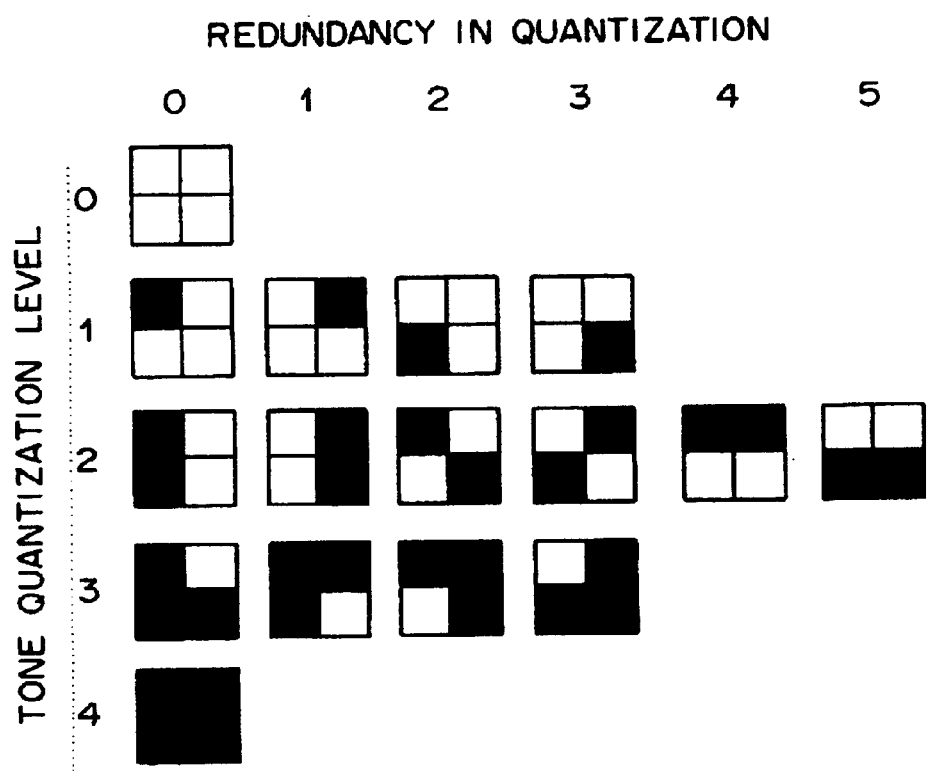
FIG. 16 is a diagram showing models of tones expressed by an area change of a unit composed of 4 binary pixels.
Figure 17:
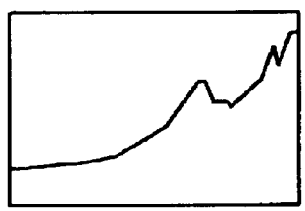
FIG. 17 is a diagram showing image composition.
Figure 17:
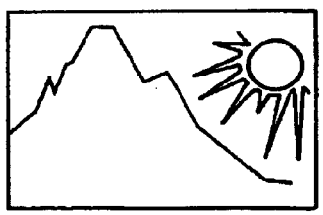
Figure 17:
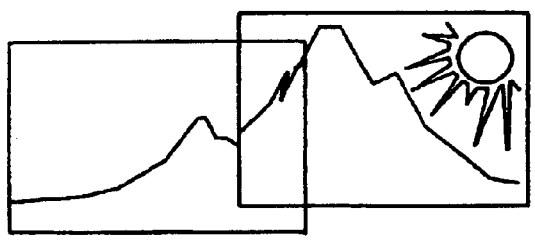
Figure 18:
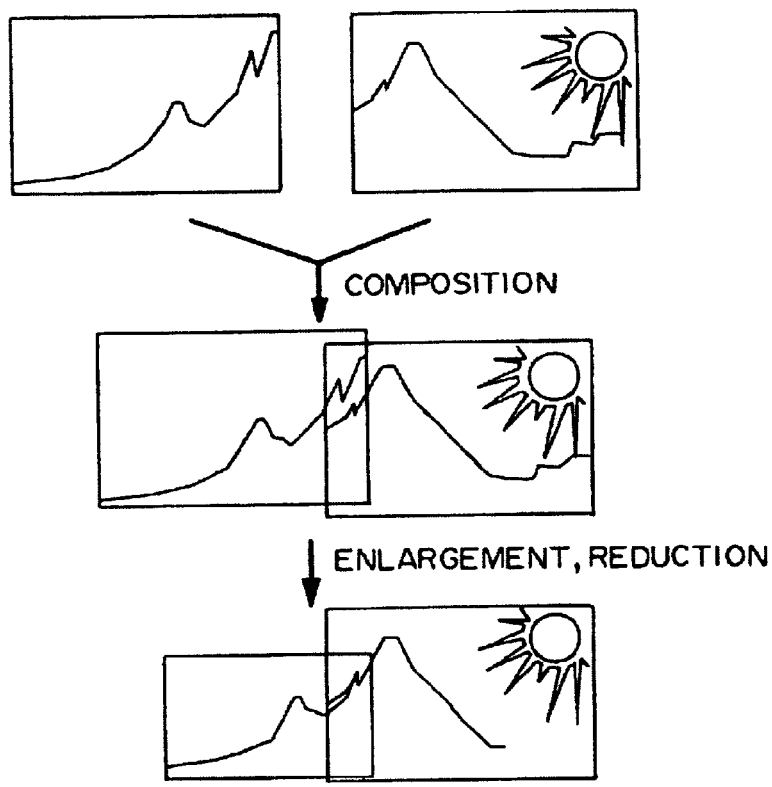
FIG. 18 is a diagram showing other image composition.
Figure 19:
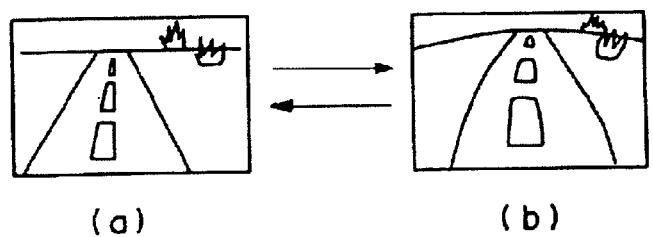
FIG. 19 is a diagram explaining image aberration due to a lens.

An operation of the eighth embodiment will be explained below. FIG. 15 is a diagram for explaining the operation of the eighth embodiment. A subject is photographed by the imaging means 70. At this time, in the case where the photographing mode selecting means has selected a mode wherein the image data are recorded in the recording medium 73 as they are, the image data obtained by photographing are sequentially recorded in the recording medium 73. In the case where the selecting means 71 has selected a photographing mode wherein the image data are used as the supplementary information H, the image data photographed in the mode (second image data S12) are embedded as the supplementary information H in image data photographed before (first image data S11) by the embedding means 72. As the first image data S11, not only image data photographed before the second image data S12 but also image data selected by a photographer can be used. At this time, as shown in FIG. 15, the second image data S12 are converted into monochrome data and also binary converted. The second image data S12 are then embedded in the least significant bit in the 8-bit R signal of the first image data S11 as the supplementary information H. In this manner, the image data S0 in which the supplementary information H has been embedded by deep layer encryption are obtained.

When such image data S0 are reproduced, since the supplementary information H is included only in the least significant bit, the image data S0 are reproduced in a state where the supplementary information H is hardly discerned. The image represented by the supplementary information H can be reproduced by reproducing only the least significant bit of the R signal of the image data S0. Since the supplementary information H has been converted into binary data, the image can be reproduced and sufficiently discerned even when only 1 bit represents the supplementary information. Furthermore, since the supplementary information H can be used for almost all pixels of the image data S0, the image can be reproduced at a substantially high resolution.

By embedding the second image data S12 as the supplementary information H in the first image data S11 by deep layer encryption, the first image data S11 are always accompanied by the supplementary information H, and the supplementary information H is not lost or altered even when repeated manipulation, saving or reading is carried out on the first image data S11. In some cases, a construction is proven to be authorized by retaining photographed images of the construction site and a blackboard describing the name of the site, the time and date of photographing, and progress as construction information. In such a case, by embedding the construction information as the supplementary information H in the first image data S11 representing the construction site, the supplementary information is not lost or altered easily, and an illegal act such as forging the construction information is prevented.

In the eighth embodiment, the supplementary information H is embedded in the least significant bit of the R signal.

However, the present invention is not limited to this example, and the supplementary information may be embedded in a high frequency band of the first image data S11. Alternatively, the supplementary information H may be embedded by using the quantization error occurring upon quantization of the first image data S11.

What is claimed is:

1. A method of embedding information in original data of an original image, the method comprising the steps of:

storing supplementary photographic information related to the original image in predetermined storage separate from the original image data;

generating storage management location information indicating where the supplementary photographic information has been stored; and embedding the storage management location information within the original data, wherein the supplementary photographic information is at least one selected from the group consisting of a photographed scene, light source information, exposure correction, and color fog correction.

2. The information embedding method as claimed in claim 1, wherein the storage management location information is encrypted by deep layer encryption and embedded within the original data.

3. An apparatus for embedding information in original data of an original image, the apparatus comprising:

supplementary information storing means for storing supplementary photographic information related to the original image in predetermined storage;

storage management information generating means for generating storage management location information indicating where the supplementary location information has been stored; and embedding means for embedding the storage management location information within the original data, wherein the supplementary photographic information is at least one selected from the group consisting of a photographed scene, light source information, exposure correction, and color fog correction.

4. The information embedding apparatus as claimed in claim 3, wherein the embedding means embeds the storage management location information in the original data by carrying out deep layer encryption on the storage management location information.

5. A computer-readable recording medium storing a program to cause a computer to execute a method of embedding information in original data of an original image, the program comprising the procedures of:

storing supplementary photographic information related to the original image in predetermined storage separate from the original image data;

generating storage management location information indicating where the supplementary photographic information has been stored; and embedding the storage management location information within the original data, wherein the supplementary photographic information is at least one selected from the group consisting of a photographed scene, light source information, exposure correction, and color fog correction.

6. The computer-readable recording medium as claimed in claim 5, wherein the procedure of embedding is a procedure of embedding the storage management location information in the original data by carrying out deep layer encryption on the storage management location information.

* * * * *